Oct. 8, 1935.  R. T. JACKSON  2,016,783
LEVER BUCKLE OR SLIDE
Filed Sept. 8, 1934
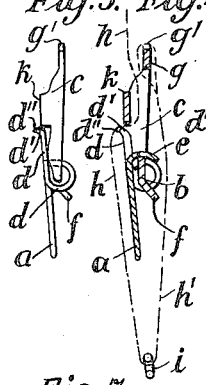
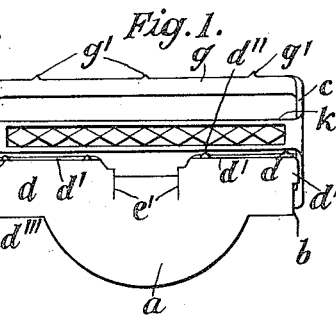
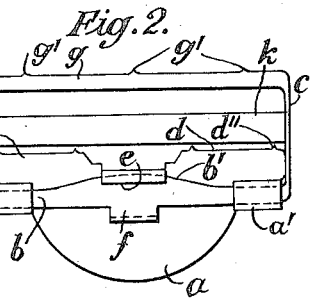
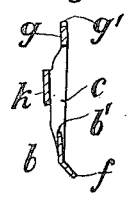
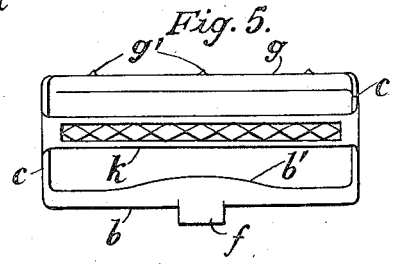
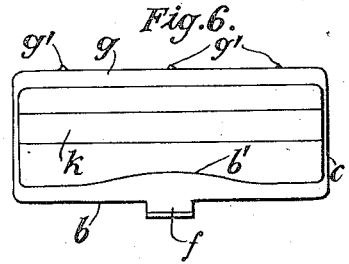
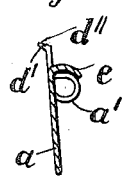
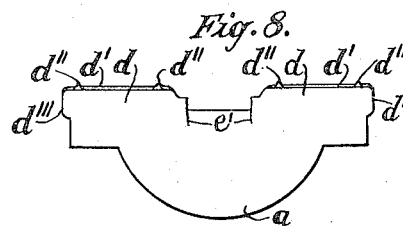
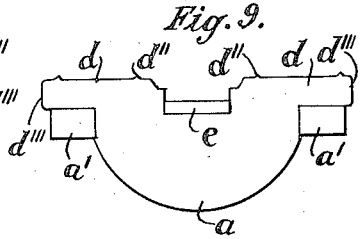
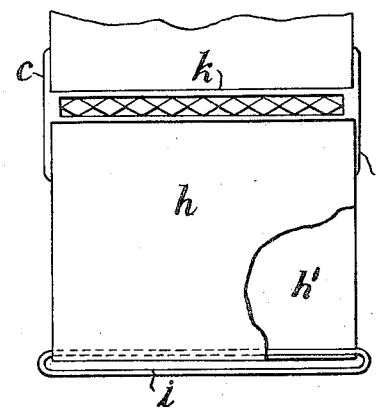
INVENTOR
Roland Thomas Jackson
BY
Victor D. Borst
ATTORNEY Patented Oct. 8, 1935

2,016,783

UNITED STATES PATENT OFFICE 2,016,783

LEVER BUCKLE OR SLIDE

Roland Thomas Jackson, Market Harborough, England, assignor to R. & W. H. Symington & Company Limited, Market Harborough, England, a company of England Application September 8, 1934, Serial No. 743,169
In Great Britain February 23, 1934

5 Claims. (Cl. 24—184)

This invention relates to improvements in lever buckles or slides of the kind comprising a three bar frame structure and of which the construction is adapted for being concealed by the webbing with which it is operatively related in securing the adjusted position thereof relatively to the garment or article associated therewith for the purpose of being held in suspended or other desired condition.

The object of the present improvements is to afford increased certainty of action on the part of the lever, to ensure the retention of the webbing in adjusted position and to limit the pivotal movement of the lever when releasing the hold on the webbing for the purpose of adjusting the same or otherwise, the improvements having reference to the concealed buckle or slide described in the concurrently filed application, Ser. No. 743,168.

According to this invention, the lever device is formed with laterally disposed parts or end portions whereof each is provided with a slight lip or projecting edge having outwardly tending small projections near the ends. Thus, in cooperation with the lower edge of the middle bar, the lever device is enabled to effect such a hold upon the webbing as to render its position of adjustment absolutely secure; while, as a protection against accidental displacement during wear, there is arranged between the aforesaid laterally disposed parts a rearwardly bent or curved leaf-like extension which is adapted to ride over and make contact with or engage the bottom bar which is formed with an upwardly or angularly directed part for the purpose. By these means a catch-like effect is obtained as the result of the contact of the leaf-like extension with the bottom bar being effected with a certain degree of spring or yield. In the event of thin or flimsy make of webbing being employed the top bar is provided with small projections, similar to those on the lips pertaining to the lever, so as to arrest any tendency to slipping.

In order that the invention may be readily understood and carried into effect same will now be more fully described with reference to the accompanying drawing, in which:—

Figure 1 is a front elevation of a concealable lever buckle or slide having the present improvements applied thereto.

Figure 2 is a corresponding rear view thereof.

Figures 3 and 4 are respectively an end view and vertical section corresponding with Figures 1 and 2.

Figures 5, 6 and 7 are views of the frame structure detached.

Figures 8, 9 and 10 are views of the lever device detached.

Figure 11 is a front elevation showing the manner of concealment of the buckle or slide according to the invention.

The lever device, indicated by the reference $a$, is pivotally mounted on the bottom bar $b$ of the frame structure $c$ by means of the turned-over end portions $a'$ $a'$ and formed with laterally disposed parts or end portions $d$ each having a slight lip or projecting edge $d'$ and outwardly tending small projections $d''$; the outer ends of the said parts being extended as at $d'''$ to overlap the adjacent part of the frame structure $c$. Between the parts $d$, $d$ the lever device is formed with a rearwardly bent or curved leaf-like extension $e$ which is adapted by means of slits $e'$ in the body of the lever to make spring or yielding contact with the upwardly directed enlargement $b'$ of the bottom bar $b$, thereby realizing a catch action which effectually obviates all risk of displacement during wear. $f$ indicates a downwardly extending obtusely angled lug whereby the pivotal movement of the lever device $a$ is limited and unnecessary extent of opening of the buckle avoided when it is required to adjust the webbing by taking-up or letting-out the same. The top bar $g$ of the frame structure $c$ is formed with small projections $g'$ (similar to those indicated at $d''$) to serve in retaining the webbing affixed thereon (by sewing, swedging or other known or convenient means) in position; the said projections $g'$ while serving to prevent slipping in cases where a thin or flimsy webbing is employed being of a character which is harmless to the webbing.

It will be readily appreciated that, by means of the hereinbefore described improvement in or modification of the lever buckle or slide described in the specification of the aforesaid application Serial No. 743,168, the buckle while possessing the characteristic of concealment, possesses the further characteristics of increased certainty of action on the part of the lever device, increased facility for adjusting the webbing in its relation to the buckle and the reduction of risk of slipping or displacement during wear to a minimum.

Moreover, adjustment is capable of easy accomplishment by manipulating the lever device through the webbing itself, as will be readily apparent from an inspection of the drawings annexed to this specification and whereof Figure 11 demonstrates the almost wholly concealed appearance of the buckle or slide. The webbing is indicated by the reference letters h, h' the former representing the front part and the latter the back stretch thereof extending from the ring or slide i which is assumed to belong to a suspender or similar appliance.

With the exception of slight lateral projections of the frame structure c, only the middle bar k with which the lever device a co-operates in establishing the position of the buckle on the webbing is visible so that adjacent articles of clothing are not subjected to deleterious frictional contact with metal parts of the buckle as in the case of buckle constructions heretofore known or proposed.

What I claim and desire to secure by Letters Patent of the United States is:—

1. A concealed lever buckle comprising a three bar frame structure, a lever device pivotally mounted on the bottom bar of the frame and having the effective edge formed with end portions having slightly lipped edges and outwardly extending small projections and a centrally positioned and rearwardly curved spring-like portion which is adapted to ride over and contact with the bottom bar of the frame, webbing attached to the top bar of the frame and carried downward therefrom into loop formation whence it is passed upward in front of the buckle and lever, between the lipped edges of the lever and the adjacent co-acting edge of the middle bar of the frame, behind the said middle bar, upward therefrom in front of the top bar and of the end of the webbing which is attached thereto.

2. A concealed lever buckle comprising a three bar frame structure, a lever device pivotally mounted on the bottom bar of the frame and having the effective edge formed with end portions having slightly lipped edges and outwardly extending small projections and a centrally positioned and rearwardly curved portion formed by slitting the body of the lever and adapted to ride over in contact with and engage the bottom bar in a springy and yielding manner and having webbing attached to the top bar of the frame and carried downward therefrom into loop formation, whence it is passed upward in front of the buckle and lever, between the lipped edges of the lever and the adjacent co-acting edge of the middle bar of the frame, behind the said middle bar, upward in front of the top bar and of the end of the webbing attached thereto.

3. A concealed lever buckle comprising a three bar frame structure, a lever device pivotally mounted on the bottom bar of the frame and having an effective edge formed with end portions having slightly lipped edges and outwardly extending small projections and a centrally positioned and rearwardly curved spring-like portion, an upwardly curved portion of the bottom bar positioned thereon to receive the aforesaid centrally positioned and rearwardly curved portion of the lever in a springy and yielding manner and webbing which is attached to the top bar of the frame, carried downward therefrom into loop formation, passed thence upward in front of the buckle and lever, between the lipped edges of the lever and the adjacent co-acting edge of the middle bar of the frame, behind the said middle bar and upward in front of the top bar and of the end of the webbing attached thereto.

4. A concealed lever buckle comprising a three bar frame structure, a lever device pivotally mounted on the bottom bar of the frame and having the effective edge formed with end portions having slightly lipped edges and outwardly extending small projections and a centrally positioned and rearwardly curved spring-like portion adapted by lateral slits in the body of the lever to yieldingly ride over and contact with a co-acting upwardly curved part of the bottom bar and webbing which is attached to the top bar of the frame, carried downward therefrom into loop formation, passed thence upward in front of the buckle and lever between the lipped edges of the lever and the adjacent co-acting edge of the middle bar of the frame, behind the said middle bar and upward in front of the top bar and of the end of the webbing attached thereto.

5. A concealed lever buckle comprising a three bar frame structure, a lever device pivotally mounted on the bottom bar of the frame and having the effective edge formed with end portions having slightly lipped edges and outwardly extending small projections and a centrally positioned and rearwardly curved spring-like portion, slits in the body of the lever laterally disposed in relation to the central curved portion thereof, an upwardly curved part of the bottom bar to receive the aforesaid spring-like portion, small outwardly extending projections on the top bar of the frame, webbing having one end attached to the said top bar, carried downward from thence into loop formation, passed thence upward in front of the buckle and lever, between the lipped edges of the lever and the adjacent co-acting edge of the middle bar of the frame, behind the said middle bar and upward in front of the top bar and thence to an article of apparel for attachment thereto.

ROLAND THOMAS JACKSON.